United States Patent
Schmidt et al.

(10) Patent No.: US 12,200,515 B2
(45) Date of Patent: Jan. 14, 2025

(54) VERIFICATION OF WIRELESS NETWORK CONNECTION

(71) Applicant: Comcast Cable Communications, LLC, Philadelphia, PA (US)

(72) Inventors: Weston Schmidt, San Jose, CA (US); Michael Chen, Wallingford, PA (US); Sreekant Kotay, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 155 days.

(21) Appl. No.: 16/058,185

(22) Filed: Aug. 8, 2018

(65) Prior Publication Data
US 2020/0053578 A1    Feb. 13, 2020

(51) Int. Cl.
*H04W 24/06* (2009.01)
*H04W 84/12* (2009.01)
*H04W 88/16* (2009.01)

(52) U.S. Cl.
CPC ............ *H04W 24/06* (2013.01); *H04W 84/12* (2013.01); *H04W 88/16* (2013.01)

(58) Field of Classification Search
CPC ..... H04W 24/06; H04W 84/12; H04W 88/16; H04W 48/17; H04W 48/16
See application file for complete search history.

(56) References Cited

U.S. PATENT DOCUMENTS

| | | | |
|---|---|---|---|
| 2003/0101281 A1* | 5/2003 | Andrews | H04L 61/00 709/245 |
| 2004/0019786 A1* | 1/2004 | Zorn | H04L 63/061 713/168 |
| 2013/0205040 A1* | 8/2013 | Naor | H04L 61/256 709/238 |
| 2014/0269411 A1* | 9/2014 | Pelland | H04L 41/0806 370/254 |
| 2016/0065383 A1* | 3/2016 | Lu | H04M 7/125 700/275 |
| 2016/0113043 A1* | 4/2016 | O'Brien | H04W 76/12 370/338 |
| 2016/0277928 A1* | 9/2016 | Yue | H04W 12/50 |
| 2017/0094694 A1* | 3/2017 | Chen | H04W 84/12 |
| 2017/0374071 A1* | 12/2017 | Visuri | H04L 63/101 |
| 2018/0167812 A1* | 6/2018 | Nagarajamoorthy | H04W 4/80 |
| 2018/0332471 A1* | 11/2018 | Zhu | H04L 63/061 |

* cited by examiner

*Primary Examiner* — Harry H Kim
*Assistant Examiner* — Mohammed M Murshid
(74) *Attorney, Agent, or Firm* — BakerHostetler

(57) ABSTRACT

Systems, methods, and apparatuses are described for verification of wireless network connection. A wireless local area network may comprise a client device and a gateway. A data connection, within the wireless local area network, between the client device and the gateway may be verified based on gateway identifiers provided to the client device via data communication channels internal and external the wireless local area network.

20 Claims, 6 Drawing Sheets

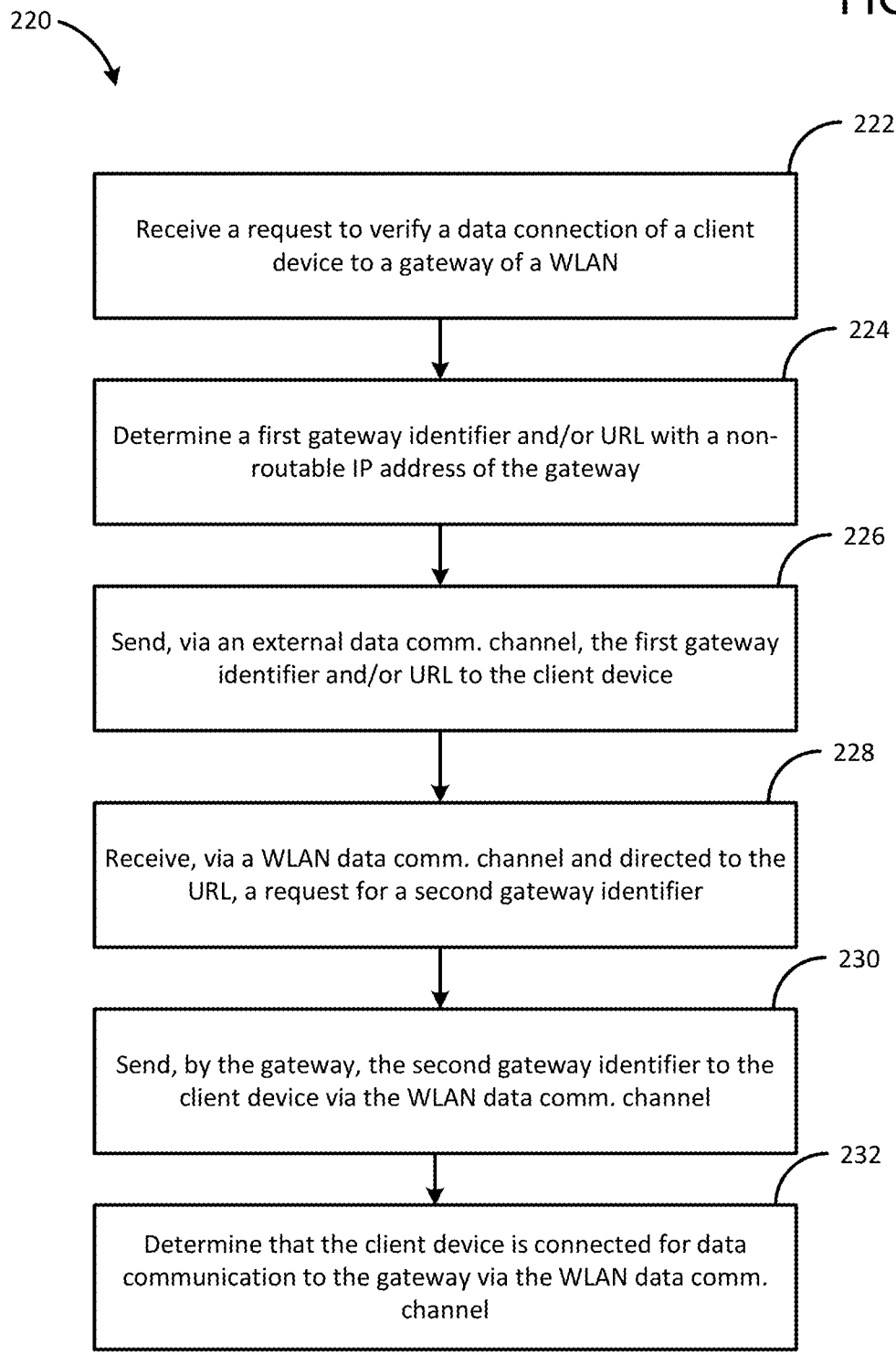

VERIFICATION OF WIRELESS NETWORK CONNECTION

BACKGROUND

Wireless local area networks (WLAN), such as Wi-Fi networks, are increasingly installed at user residences and other similar locations. A WLAN may comprise a gateway device (e.g., a wireless router) that may enable data communication, via the WLAN, between a client device (e.g., a mobile device or laptop computer) and other systems and networks outside of the WLAN. Configuring the client device for full data communication, via the gateway, to systems and networks external to the WLAN may present one or more challenges. Improvements in client device WLAN configuration are needed.

SUMMARY

Systems, methods, and apparatus are described for verification of a wireless network connection. A client device may be intended to be configured to connect to and exchange data communications with a gateway in a WLAN. To verify the client device's data connection to the gateway, a non-routable IP address and gateway identifier of the gateway may be provided to the client device from a trusted source external to the WLAN. The client device may attempt data transmissions to the gateway's non-routable IP address via a WLAN data communication channel within the WLAN and a data communication channel external to the WLAN. If the data transmission via the WLAN data communication channel is successful, the gateway may send a gateway identifier to the client device. The initial gateway identifier from the external source and the gateway identifier received from the gateway based on the data transmission to the gateway may be compared. If the two gateway identifiers match, the data connection to the gateway via the WLAN may be verified. If the gateway identifiers do not match, this may indicate that the client device is connected to an unintended gateway.

BRIEF DESCRIPTION OF DRAWINGS

The accompanying drawings, which are incorporated in and constitute a part of this specification, together with the description, serve to explain the principles of the methods, systems, and apparatuses:

FIG. 2B shows a flow diagram of a method.

DETAILED DESCRIPTION

Figure 1:
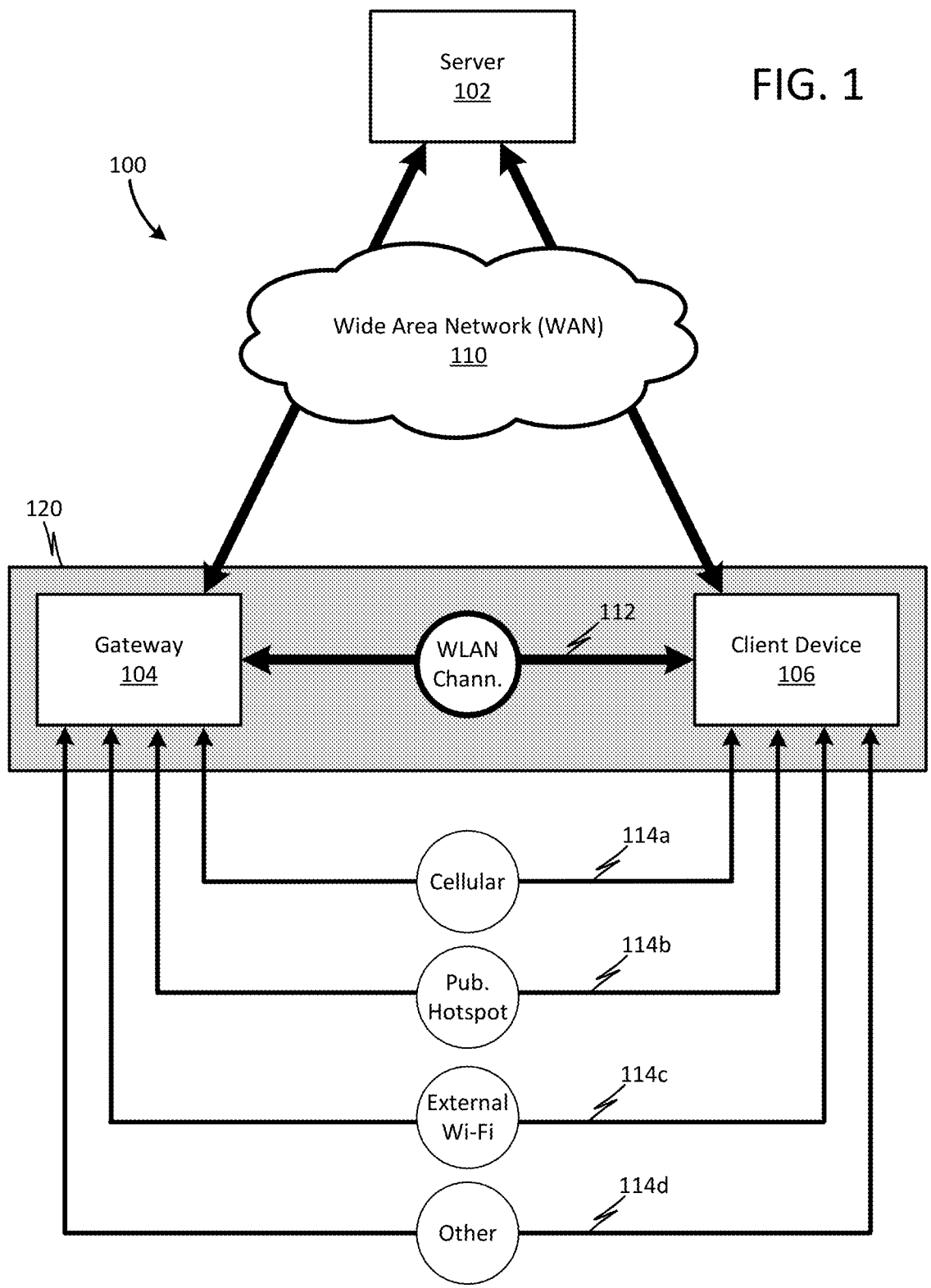
FIG. 1 shows a schematic diagram of a system.

Systems, methods, and apparatuses are described for verifying a wireless data connection between a client device and a gateway within a wireless local area network (WLAN). In addition to the intended WLAN data communication channel to the gateway, the client device may be in data communication with the gateway via other external data communication channels, such as a cellular network. The systems, methods, and apparatuses may verify that the client device is, in fact, able to exchange data communications with the gateway via the WLAN data communication channel.

The verification process may be implemented in conjunction with an installation of a new WLAN, an expansion or reconfiguration of an existing WLAN, or simply the maintenance of a WLAN, although is not so limited. Challenges may arise in performing these processes.

A client device may indicate that the client device (and/or other elements of the WLAN) is configured to fully connect to the WLAN and that the client device is able to communicate data with external network resources via the WLAN. The indication may be presented via a Wi-Fi connection icon or "bars" on the client device's display. Yet the client device (and/or other elements of the WLAN) may be not so configured and the client device instead may revert to a cellular connection or other external data communication channel, possibly without the user's knowledge. In this case, the user may experience decreased network performance and/or incur cellular data usage charges.

The client device may connect to an unintended gateway device. The unintended gateway connection may be accidental and benign, such as may be the case with a neighbor's gateway or in an apartment building with many gateways in close proximity. Yet in other cases, a third party may facilitate such a mistaken identity of the gateway device for the purposes of intercepting data to and from the client device and extracting personal and confidential information.

To verify that the client device is properly connected to the gateway via the WLAN data communication channel, the client device may request for and receive a URL comprising a non-routable IP address associated with the gateway and a gateway identifier of the gateway. The URL and/or the gateway identifier may be originated from the gateway and relayed to the client device, such as via a trusted server external to the WLAN. The client device may initiate a data transmission to the gateway via the WLAN data communication channel and one or more data transmissions to the gateway via the external data communication channel. The data transmissions may use the URL from the gateway and be addressed to the non-routable IP address. The client device may monitor for a response (or lack thereof) to each data transmission, which may indicate that the data transmission was successful or not. Based on those responses, the WLAN data communication channel to the gateway may be verified, at least in part. If both the data transmission to the gateway via the WLAN data communication channel was successful and the data transmissions to the gateway via the external data communication channels were not successful, this may indicate, at least in part, that the client device is correctly connected to the gateway within the WLAN.

The client device may determine that it is indeed connected to the intended gateway, rather than an accidental or malicious third-party gateway. In causing the aforementioned data transmissions via the WLAN and external data communication channels, the client device may request for and receive a gateway identifier from the responding gateway. The client device may compare this gateway identifier from the responding gateway with a gateway identifier stored on the client device. This gateway identifier already stored on the client device may indicate the true, intended gateway of the WLAN. If the newly-received gateway identifier matches the stored gateway identifier, the client device 106 may determine that the client device is indeed connected to the correct gateway, rather than one controlled by a third party.

FIG. 1 shows a system 100, which may comprise a gateway 104, a client device 106, and a server 102. The gateway 104 and the client device 106 may each be in mutual data communication with the server 102 via a wide area network (WAN) 110. The gateway 104 may at least partially define a WLAN 120. Within the WLAN 120, the client device 106 may potentially communicate data via a wireless local area network data communication channel (WLAN data communication channel) 112. The client device 106 may potentially communicate data with the gateway 104 via one or more external data communication channels 114, which may be external to the WLAN 120. The successful data connection, via the WLAN data communication channel 112, between the client device 106 and the gateway 104 may be verified. The client device 106 may access the WAN 110 via the WLAN data communication channel 112 and the gateway 104 rather than (or in addition to) the external data communication channel 114.

The data communicated via the WLAN data communication channel 112 and/or the external data communication channels 114 may comprise user data and/or control data. User data may comprise data indicating the actual user message or messages that are intended to be transmitted to the destination. User data may comprise payload data. By contrast, control data may comprise data to effectuate the transmission of the user data. Control data may comprise metadata (e.g., describing the user data and/or transmission itself), headers, trailers, framing elements, protocol information, error checking data (e.g., cyclic redundancy check (CRC)), source address, destination address, and the like. A network packet may comprise a payload or body of data and various sorts of control data.

The client device 106 may comprise any of a variety of computing devices configured for wireless communication. The client device 106 may comprise a smart phone, a tablet computer, a portable gaming device, or a laptop computer. The client device 106 may comprise a desktop computer or other stationary computing device, such as a wireless-enabled smart television, digital media player, DVD or Blu-ray player, or gaming console.

The client device 106 may be configured for wireless communication, including wireless user data communication. The client device 106 may comprise one or more wireless transceivers. The wireless transceiver may be configured to communication via the WLAN 120 or other wireless local area networks (e.g., a Wi-Fi WLAN). The wireless transceiver may be configured to communicate over a cellular network, such as an LTE cellular network. As such, the client device's 106 Wi-Fi transceiver may be used to communicate with the gateway 104 while the client device's 106 cellular transceiver may be used to communicate with a cellular network and, by extension, the WAN 110. The client device 106 may communicate user data via the WAN 110, such as when—and by virtue of—the client device 106 is able to successfully communicate user data with the gateway 104.

The gateway 104 may be realized in the form of a router, a residential gateway, a cable or DSL modem, a network switch, a network bridge, a wireless access point, a combination thereof, or any other network device configured to operate according to the techniques described herein. The gateway 104 may comprise an internal-facing network interface for communications (e.g., user data communications) within the WLAN 120 and an external-facing network interface for communications (e.g., user data communications) external to the WLAN 120, such as user data communications to and from the WAN 110.

The gateway 104 may be configured to differentiate communications and/or attempted communications received from within the WLAN 120 and those received from external the WLAN 120. The gateway 104 may differentiate based on the network interface engaged, such as whether the communication or attempted communication is directed to an internal-facing (e.g., WLAN) network interface or whether the communication or attempted communication is directed to the external network interface. Data communications via the WLAN data communication channel 112 may be directed to an internal-facing interface of the gateway. Data communication via one of the external data communication channels 114 may be directed to the external-facing network interface of the gateway 104.

The gateway 104 may effectuate user data communication between networks, such as the WAN 110 and the WLAN 120. Devices, such as the client device 106, may connect to and authenticate with the gateway 104. As such, the gateway 104 and any devices connected to and authenticated with the gateway 104 may define, at least in part, the WLAN 120. The WLAN 120 may be associated with a premises and comprise devices located at the premises. In some instances, the WLAN 120 may comprise more than one gateway 104.

The client device 106 and/or other devices of the WLAN 120 may connect to the gateway 104 via a wireless data communication channel (e.g., the WLAN data communication channel 112) and/or a wired data communication channel (e.g., Ethernet). The data communications between the client device 106 and other devices on the WLAN 120 may be coordinated through the gateway 104. The gateway 104 may serve as a point of access for inbound data traffic from the WAN 110 and outbound data traffic to the WAN 110. The gateway 104 may enable outside data communications (e.g., Internet data communications) to and from a client device, such as when the client device 106 and/or other devices on the WLAN 120 successfully connect to and authenticate with the gateway 104.

One or more identifiers may be used to identify the gateway 104. The identifier may be a unique identifier with respect to the gateway 104. For example, the gateway 104 may be identified by a universally unique identifier (UUID). The gateway 104 may be identified by a MAC (media access control) address and/or a service set identifier (SSID). The SSID may not only identify the gateway 104 but also the WLAN 120 itself. The one or more identifiers may be stored in a memory of the gateway 104, such that the gateway 104 may provide the one or more identifiers based on and/or in response to a request. The gateway 104 may be assigned or take on a temporary gateway "identifier." The server 102 may assign or direct the gateway 104 to use this temporary gateway identifier. The gateway 104 may provide the temporary gateway identifier when requested by the client device 106. The temporary gateway identifier may be provided when the gateway 104 is requested to provide the gateway's 104 gateway identifier.

Various routing functions, including IP address routing, may be performed by the gateway 104. The gateway 104 may provide routing with respect to routable IP addresses and non-routable IP addresses. When the gateway 104 receives a network packet (e.g., an HTTP request) from the WAN 110 (i.e., outside the WLAN 120) that is addressed to a routable IP address, the gateway 104 may reference a routing table and forward the network packet to the appropriate device on the WLAN 120. When the gateway 104 receives a network packet (e.g., an HTTP request), from the WAN 110 (i.e., outside the WLAN 120) that is addressed to a non-routable IP address, the gateway 104 may be unable (and is expected to be unable) to route the network packet to any of the devices within the WLAN 120. The gateway 104 may return an error message to the external network packet originator indicating that the network packet could not be delivered. If the gateway 104 receives a network packet from within the WLAN 120 that is addressed to a non-routable IP address, the gateway 104 may still be able to route the network packet to one or more of the devices of the WLAN 120 indicated in the network packet.

The gateway 104 may be configured to receive and respond to an HTTP request, both from within the WLAN 120 and from outside the WLAN 120. The gateway 104 may receive an HTTP request from the client device 106 to verify the client device's 106 connection (with respect to user data) to the gateway 104. For example, the HTTP request may comprise a non-routable IP address. If the HTTP request with the non-routable IP address is received from within the WLAN 120, the gateway 104 may respond with a success indicator, such as an HTTP success status code. If the HTTP request with the non-routable IP address is received from outside of the WLAN 120, the gateway 104 may respond with an error indicator, such as an HTTP error status code.

The user data communication between the client device 106 and the gateway 104 within the WLAN 120 may be effectuated via the WLAN data communication channel 112. The WLAN data communication channel 112 may comprise a Wi-Fi connection and may conform to IEEE 802.11 standards. The WLAN data communication channel 112 may use the 2.4 gigahertz or the 5 gigahertz radio bands. Other data communication channels within the WLAN 120 between the gateway 104 and the client device 106 may comprise a wired data connection, such as an Ethernet connection.

One or more external data communication channels 114 may effectuate user data communication between the client device 106 and the gateway 104. The data communication between the client device 106 and the gateway 104 via the external data communication channel 114 is external to the WLAN 120. That is, this data communication may generally occur without use of the WLAN 120 or the WLAN data communication channel 112. The external data communication channel 114 may exchange data with the gateway 104 via the gateway's 104 external-facing network interface. Data communication via the external data communication channel 114 may comprise data communication via the WAN 110. The external data communication channel 114 may be considered part of the WAN 110.

The external data communication channel 114 may comprise a cellular network data communication channel 114a, such as an LTE or 4G cellular network. If so equipped, the client device 106 may use a cellular transceiver to establish the cellular network data communication channel 114a.

The external data communication channel 114 may comprise an external Wi-Fi data communication channel 114c (distinct from the WLAN data communication channel 112) that is external to the WLAN 120. The external data communication channel 114 may comprise a Wi-Fi data connection made available by a Wi-Fi public hotspot 114b. A Wi-Fi public hotspot commonly may be provided by and/or located at a coffee shop, library, or airport. Wi-Fi public hotspots are also increasingly offered by government municipalities. The client device 106 and the gateway 104 may be located at a premises. The inhabitants of a neighboring premises may maintain a gateway intended for the inhabitants' use. It may be possible for the client device 106 to connect to the neighboring premises' gateway, thereby enabling the client device 106 to connect to and communicate data via the WAN 110. The neighboring premises' gateway may be a gateway of a WLAN distinct from the WLAN 120 or intended WLAN 120.

The external data communication channel 114 may comprise a data connection (not specifically shown in FIG. 1) to a second client device or other similar device. The client device 106 may connect to (e.g., tether with) a nearby cellular device, such as via Bluetooth or even a wired connection. The cellular (or other type) device may serve as a mobile hot spot for the client device 106. Accordingly, the cellular device may afford the client device 106 access to the WAN 110 via the cellular device's cellular connection. The external data communication channel 114 is not limited to the specific forms of data communication channels described herein. Other external data communication channels 114d may be used to communicate data, external to the WLAN 120, between the client device 106 and the gateway 104.

Use of the external data communication channels 114 is not limited only to data communications between the gateway 104 and the client device 106. The external data communication channel 114 may effectuate data communications to other network elements made accessible via the WAN 110. The client device 106 may communicate data with the server 102 via the external data communication channel 114.

The server 102 may comprise one or more networked computing devices accessible via the WAN 110. The server 102 may be associated with an entity providing Internet service to the gateway 104 and/or the client device 106. The server 102 may be configured to facilitate a process to verify that the client device 106 is able to communicate user data with the gateway 104 via the WLAN data communication channel 112. Based on (e.g., responsive to) a request from the client device 106, the server 102 may request for and receive a verification URL and/or gateway identifier from the gateway 104 and relay that data to the client device 106.

The server may maintain a database (not shown) of relevant information. This information may comprise information and/or identifiers relating to accounts (e.g., user accounts or residence accounts). The information stored in the database may comprise information and/or identifiers relating to respective gateway(s) associated with each account. The information stored in the database may comprise information and/or identifiers relating to respective client device(s) 106 that may be associated with each account and, by extension, each gateway 104. This information may allow a user at the client device 106 to login in to the server 102 and begin the data connection verification process by providing the client device's 106 identifier. The server 102 may cross-reference the identifier of the client device 106 and/or the identifier of the user's account and determine the appropriate gateway 104 from which to request the verification URL.

The WAN 110 may enable data communication between the various components of the system 100. The WAN 110 may generally refer to a network that is external to the WLAN 120 and may be public, private, or a combination thereof. The WAN 110 may comprise the Internet and/or a cellular network. The WAN 110 may be realized in the form of wired and/or wireless communication media. The external data communication channels 114 may communicate data, at least in part, via the WAN 110. The external data communication channels 114 may be considered a part of the WAN 110.

Figure 2A:
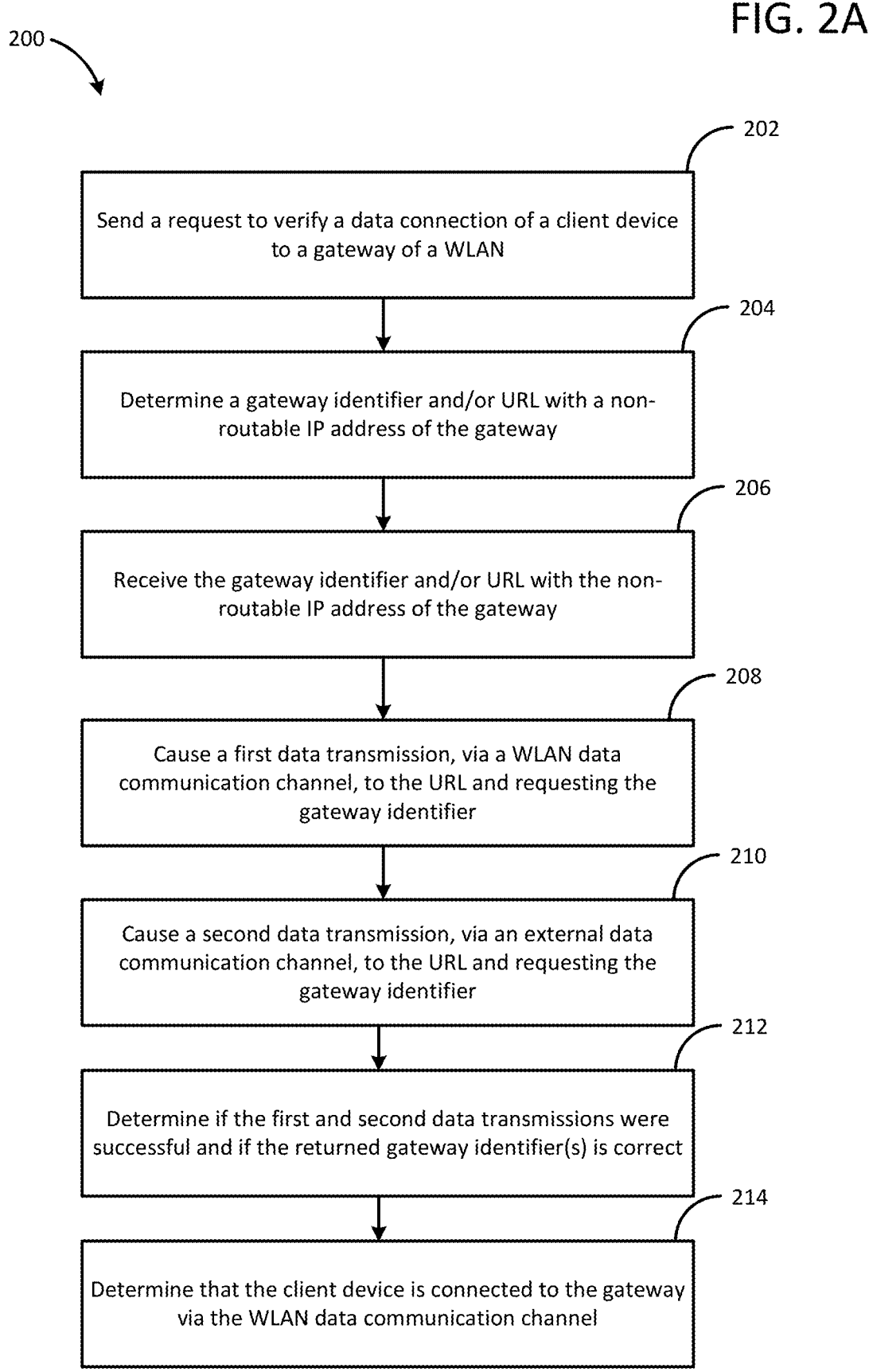
FIG. 2A shows a flow diagram of a method.

FIG. 2A shows a method 200. The method 200 may serve to verify a user data connection of a client device to a gateway within a WLAN. The method 200 may be performed in a system similar in some respects to the system 100 of FIG. 1. At step 202, a request may be sent to initiate a verification process. The verification process may verify an internal user data connection from a client device to a gateway within a WLAN (e.g., the client device 106, the gateway 104, and the WLAN 120, respectively, of FIG. 1). The verification process may be directed to a WLAN data communication channel (e.g., the WLAN data communication channel 112) within the WLAN that is anticipated to enable user data communication between the client device and the gateway. The WLAN data communication channel is anticipated to enable user data communication, via the gateway, to and/or from the client device and network resources external to the WLAN, such as network resources on the Internet. The WLAN data communication channel may form a portion of the WLAN. The WLAN data communication channel may form a portion of the WLAN at such time that the client device is configured to communicate user data with the gateway of the WLAN. The WLAN data communication channel may be wireless (e.g., Wi-Fi), but is not so limited.

The client device and the gateway may be located at a common premises. The client device may be realized as a stationary device (e.g., a set-top device or desktop computer) or a mobile device. The client device (e.g., a mobile device) may be located at the premises only intermittently. The cellular functions of the client device may be used while the client device is external to the premises. It may be expected, such as when the client device returns to the premises, that the client device utilizes or attempts to utilize the WLAN for at least user data functions.

The request may be sent by the client device to a server (e.g., the server 102 of FIG. 1) located external to the WLAN. The server may receive the request. The request may comprise a request to receive a gateway identifier from the gateway of the WLAN. The request may comprise a request for the server to receive the gateway identifier and/or for the server to send the gateway identifier to the client device.

The request may be sent via a data communication channel that is external to the WLAN (e.g., the external data communication channels 114 and/or the WAN 110 of FIG. 1). The client device may use a cellular data connection or other Wi-Fi data connection to send the request to the server since the WLAN data communication channel is not yet verified and/or enabled. The request may be initiated by the client device based on an input to an application executing thereon. The application may be associated with the server and/or the network provider enabling data communication between the WLAN and the WAN (e.g., the Internet provider). The request may be sent by a device other than the client device.

Step 202, or any other steps of the method 200, may be performed in conjunction with or after the gateway and/or WLAN is newly installed or configured. A user associated with the client device and/or the premises may have engaged an Internet provider to install the gateway and/or the WLAN at the premises. As part of the installation and configuration, a technician may initiate the request to the server via the client device or a separate device associated with the technician and/or the Internet provider. The user may cause the request to be sent to the server. In sending the request to the server, the user or other individual may login to the server (e.g., via a website or mobile device "app") using his or her account identifier or the like. The user may enter one or more inputs on the website or "app" to effectuate the request being sent to the server.

The server may determine (e.g., based on or in response to receiving the request) the gateway of the WLAN that is associated with the user account and/or client device. The server may cross-reference the account identifier or client device identifier provided with the request from the client device to determine the associated gateway and the external IP address of the gateway.

At step 204, a network resource location such as a URL comprising a non-routable IP address (or other form of network address or location) of the gateway may be determined. Gateway data associated with the gateway may be determined. The gateway data may comprise a gateway identifier of the gateway, which may be referred to as the first gateway identifier. The URL may comprise the non-routable IP address and the first gateway identifier. The URL comprising the non-routable IP address and/or the first gateway identifier may be determined by the server.

To determine the URL comprising the non-routable IP address and/or the first gateway identifier, the server may send a request to the gateway using the gateway's external IP address. The gateway may send (e.g., based on and/or in response to the request to the gateway) the URL comprising the non-routable IP address and/or the first gateway identifier to the server.

The server may maintain a database that may store URLs, each comprising a non-routable IP address and/or a first gateway identifiers. The database may separately store a non-routable IP address and/or a first gateway identifier. The URLs, non-routable IP addresses, and/or first gateway identifiers may each be associated with a corresponding gateway. The server may reference this database to determine the URL, non-routable IP address, and/or the first gateway identifier from the database. The bare non-routable IP address and/or first gateway identifier may be received from the gateway and/or retrieved from the database. The server may construct the URL on the basis of the non-routable IP address and/or the first gateway identifier. The server may determine and provide the URL and/or the first gateway identifier of the gateway without sending a request to the gateway. The server may send the URL and/or the first gateway identifier to the client device.

The URL may be in the form of an HTTP request and may comprise a non-routable IP address of the gateway. The non-routable IP address may be referred to as a reserved IP address. A non-routable IP address may be in the IP address ranges of 10.0.0.0/8, 172.16.0.0/12, and 192.168.0.0/16.

A gateway identifier, such as the first gateway identifier, may be a unique identifier. A gateway identifier may comprise one or more of a UUID, a MAC address, or an SSID. The determined URL may comprise the first gateway identifier, such as in embedded code (e.g., javascript) of the URL. The URL comprising the first gateway identifier indicated in embedded code may be received by the server from the gateway. The first gateway identifier may be sent from the gateway to the server separately from the URL. The transmission of the first gateway identifier to the server may be executed in conjunction with the transmission of the URL to the server. Gateway data (e.g., first gateway data), associated with the gateway, may comprise the first gateway identifier. The first gateway data may comprise cryptographic data, such as a portion of encrypted data associated with the gateway. The first gateway data may comprise a nonce or other transient data used to authenticate the first gateway identifier and/or other information sent to the client device. The cryptographic data may comprise the first gateway identifier. The cryptographic data may be appended, incorporated with, and/or otherwise associated with the first gateway identifier. The first gateway data and/or the first gateway identifier may be digitally signed, such as with a private cryptographic key.

At step 206, the URL comprising the non-routable IP address of the gateway may be sent to and received by the client device. The URL may be sent from the server to the client device. The first gateway identifier may be sent to and received by the client device. The first gateway identifier may be received as code embedded in the URL or as a distinct data structure. The client device may process the URL and embedded code to extract the first gateway identifier. The client device may store the first gateway identifier.

At step 208, the client device may cause a first data transmission using the URL, which is addressed to the non-routable IP address of the gateway. In the first data transmission, the client device may attempt to connect to the non-routable IP address of the gateway so as to enable user data communication between the client device and the gateway via the WLAN data communication channel. The first data transmission may be sent via the WLAN data communication channel. The WLAN data communication channel may be within or effectuated by the WLAN of the gateway. The WLAN data communication channel may comprise a Wi-Fi data channel enabled by the gateway. The WLAN data communication channel may be the user data connection to which the method's 200 verification process is directed. The first data transmission may comprise sending a data packet to the gateway via the WLAN data communication channel. The data packet may be directed to the URL and/or the non-routable IP address of the gateway.

The client device's first data transmission to the non-routable IP address of the gateway may comprise a request for a gateway identifier, which shall be referred to as the second gateway identifier. The request for the second gateway identifier may be, at least in part, the user data and/or payload of the first data transmission and/or the data packet send to the gateway as part of the first data transmission. The second gateway identifier may be distinct from the first gateway identifier by virtue of the second gateway identifier being requested as part of or otherwise associated with the first data transmission and/or the second data transmission (e.g., sent to the client device based on or in response to the first data transmission and/or the second data transmission). The second gateway identifier may be requested for and received via the WLAN data communication channel. The first gateway identifier may be requested for and received via a data communication channel external the WLAN, such as the WAN. The first gateway identifier and the second gateway identifier may identify the same gateway (e.g., the first gateway identifier and the second gateway identifier may be identical in content, including both identifying or indicating the subject gateway). The first gateway identifier and the second gateway identifier may identify different gateways.

The second gateway identifier may comprise a unique identifier, such as the gateway's UUID. The second gateway identifier may comprise the SSID and/or the MAC address of the gateway. Because the URL may be in HTTP form, the first data transmission and/or a second data transmission to the gateway may comprise an HTTP request referring to the second gateway identifier. The URL may be "http://10.0.0.35/get_identifier" or similar.

At step 210, the client device may cause a second data transmission according to the URL and via an external data communication channel (e.g., one or more of the external data communication channels 114 of FIG. 1). The second data transmission may comprise sending a data packet via the external data communication channel to the gateway. The second data transmission may be analogous to the first data transmission, except, at the least, the second data transmission is sent via an external data communication channel rather than the WLAN data communication channel. The second data transmission by the client device may be addressed to the non-routable IP address of the gateway. Like the first data transmission, the second data transmission may comprise a request, such as an HTTP request. The second data transmission may refer to the second gateway identifier. The second data transmission may request the second gateway identifier from the gateway.

The external data communication channel may be external to the WLAN. The external data communication channel may comprise a cellular network data communication channel via the client device's cellular transceiver. The external data communication channel may comprise a Wi-Fi data communication channel that is external to the WLAN, in contrast to the WLAN data communication channel within the WLAN. The external Wi-Fi data communication channel may be enabled by a neighbor's gateway or a public hotspot. The external data communication channel may be effectuated by tethering the client device to a mobile device via which the client device may gain access to a cellular network. It is contemplated that the external data communication channel may comprise other data communication channels not enumerated here.

Additional iterations of step 210 may be performed with respect to additional external data communication channels. An additional iteration of step 210 may comprise causing a third data transmission to the non-routable IP address of the gateway via a second external data communication channel (e.g., one of the other external data communication channels 114 of FIG. 1).

At step 212, the client device (or other component of the system) may determine whether each of the first data transmission and the second data transmissions (and/or additional data transmissions) to the non-routable IP address of the gateway was successful or unsuccessful. The client device (or other component of the system) may determine if the second gateway identifier returned from the gateway is correct (e.g., the expected gateway identifier).

A successful or unsuccessful data transmission may be determined based on a response from the gateway. The response from the gateway may comprise or relate to control information, as distinguished from user data (e.g., payload data). The control information may comprise metadata. The metadata may be associated with and/or describe an aspect of the user data. The metadata may be associated with and/or describe an aspect of the response. The control information may be indicated in a header field of the response. The header field may comprise an HTTP header field. The control information may comprise a status code associated with the transmission. A status code may be indicated in a header field, such as an HTTP header field. The status code may comprise an HTTP status code. A "success" HTTP status code, such as a status code of 200 (OK) or others in the 2XX series, may indicate that a data transmission to the gateway was successful. A response indicating that a data transmission was unsuccessful may comprise an "error" HTTP status code, such as a 404 (Not Found) status code or others in the 4XX series.

A "response" from the gateway will be understood to comprise an absence of a response from the gateway. An absence of a response may be with respect to a period of time, such as a predetermined period of time. An absence of response from the gateway may indicate that a transmission was unsuccessful.

A determination that the first data transmission was successful may indicate, at least in part, that the client device is able to communicate user data, via the WLAN data communication channel, with the gateway (e.g., the client device and/or the WLAN/gateway are properly configured). A determination that the first data transmission was unsuccessful may indicate, at least in part, that the client device is unable to communicate user data, via the WLAN data communication channel, with the gateway (e.g., the client device and/or the WLAN/gateway are not properly configured). A determination that the second (or additional) data transmission was unsuccessful may indicate, at least in part, that the client device and/or the WLAN/gateway are properly configured.

A determination may be performed as to whether the second gateway identifier received from the gateway is correct (e.g., is the expected gateway identifier). The client device or other component of the system, such as the server, may determine if the second gateway identifier is correct. The second gateway identifier may be received by the client device, such as based on (e.g., in response to) the first data transmission and/or the second data transmissions from the client device to the gateway. The first data transmission and/or the second data transmission each may comprise the request for the second gateway identifier. The response from the gateway, based on the first data transmission and/or the second data transmission, may comprise the second gateway identifier. The second gateway identifier may be indicated in the user data of the response. The second gateway identifier may correspond to the gateway request in the first data transmission and/or the second data transmissions to the gateway.

The gateway may determine if the first data transmission and/or the second data transmission is successful or not. The gateway may determine if the first data transmission and/or the second data transmission was received on an expected network interface. If the first data transmission, intended to be sent via the WLAN data communication channel, is received by the gateway on an external-facing network interface (rather than the expected internal-facing network interface), this may indicate that the first data transmission was unsuccessful. If the second data transmission, intended to the sent via the external data communication channel, is received by the gateway on an external-facing network interface, this may indicate that the second data transmission was unsuccessful. If the first data transmission and/or the second data transmission is received on the expected network interface, this may indicate, at least in part, that the respective data transmission is successful. The gateway may determine if the data transmission (e.g., a data packet thereof) is routable to the non-routable IP address. If the first data transmission and/or the second data transmission is routable to the non-routable IP address, this may indicate, at least in part, that the first data transmission and/or the second data transmission, respectively, is successful. If the first data transmission and/or the second data transmission is not routable to the non-routable IP address, this may indicate, at least in part, that the first data transmission and/or the second data transmission, respectively, is unsuccessful.

The first gateway identifier may be received by the client device independent of the response(s) to the first data transmission and/or the second data transmission. The first gateway identifier may be stored on the client device and may have been previously originated by the gateway based on (e.g., in response to) a request from the server. The first gateway identifier may have been sent (e.g., via the server) to the client device. The first gateway identifier may have been sent to the client device via a data communication external to the WLAN. The first gateway identifier may have been sent to the client device via the WAN.

To determine if the second gateway identifier is correct, the second gateway identifier may be compared to the first gateway identifier, which may be already stored on the client device. If the first gateway identifier and the second gateway identifier received based on the first data transmission match, the second gateway identifier received from the gateway based on (e.g., in response to) the first data transmission may be deemed correct. If the first gateway identifier and the second gateway identifier do not match, the second gateway identifier received from the gateway based on the first data transmission may be deemed incorrect. A second gateway identifier is not expected to be received by the client device based on the second data transmission. If a second gateway identifier is received based on the second data transmission, this may indicate that the client device and/or the WLAN is not properly configured.

The determination of whether the first data transmission and/or second data transmission were successfully received by the gateway may be executed by the client device and/or the server. Likewise, the determination of whether the second gateway identifier received based on the first data transmission is correct may be executed by the client device and/or the server. The client device may transmit the relevant data to the server and the server may fulfill the aforementioned determinations. The client device may send, to the server, the second gateway identifier received by the client device based on the first data transmission. The client device may send the first gateway identifier to the server or the server may already store the first gateway identifier. The server may compare the first gateway identifier to the second gateway identifier to determine if the second gateway identifier is correct.

At step 214, a determination may be made as to whether the client device is correctly connected, via the WLAN data communication channel, to the gateway of the WLAN (such as opposed to another gateway that is not part of the WLAN). The determination may be based on the response by the gateway (or another gateway) to the first data transmission and/or the second data transmission. The response received from the gateway that was based on the first data transmission and/or second data transmission may indicate that the respective data transmission was successful or not.

A determination of correct connectivity (e.g., with respect to user data) to the gateway may be based on whether the first data transmission and/or the second data transmissions to the non-routable IP address of the gateway were successful or not. The client device may be deemed, at least in part, correctly connected to the gateway if: a) the first data transmission to the gateway, via the WLAN data communication channel, is successful; b) the second data transmission to the gateway, via the external data communication channel, is not successful; and c) any other data transmissions (if any) to the gateway, via other external data communication channels, are not successful.

If the client device is unable to reach the non-routable IP address of the gateway via the WLAN data communication channel (e.g., the first data transmission was unsuccessful), this may indicate that the client device is not properly connected to the gateway and/or properly integrated within the WLAN. Due to the nature of a non-routable IP address being reachable within the WLAN but not from outside the WLAN, the apparent inability of the client device to reach the non-routable IP address of the gateway strongly suggests that the client device is not properly configured with respect to the gateway and/or WLAN. That is, the client device is not yet part of the WLAN. If the first data transmission from the client device via the WLAN data communication channel is successful and the second data transmission from the client device via the external data communication channel is also successful, this may indicate a fault in the configuration of the client device and/or WLAN. This condition in which the first data transmission and the second data transmissions are both successful suggests a connectively error and/or misconfiguration because it is expected, if all is well, that a transmission via an external data communication channel to the gateway's non-routable IP address should not yield a success response.

The determination that the client device is connected, via the WLAN data communication channel, to the gateway may be based on the second gateway identifier transmitted from the gateway to the client device based on the first data transmission. This second gateway identifier may be compared to the first gateway identifier already stored on the client device (e.g., the first gateway identifier discussed in relation to step 204). If the first gateway identifier and the second gateway identifier match, it may be determined that the client device is correctly connected (with respect to user data), at least in part, to the gateway via the WLAN data communication channel. The match between the first gateway identifier and the second gateway identifier may indicate that the gateway to which the client device is connected is indeed the intended gateway. If the client device was connected to an incorrect gateway, such as an imposter gateway, the ("second") gateway identifier provided by the incorrect gateway based on the first data transmission would not match the expected gateway identifier.

The determination that the client device is connected to the gateway via the WLAN to effectuate user data communication between the client device and the gateway may be performed by the client device, the server, and/or the gateway. The client device may send the first gateway identifier and/or second gateway identifier to the server and the server may perform said determination based on the received first gateway identifier and/or second gateway identifier. The server may already store the first gateway identifier. The gateway may determine that the client device is correctly connected to the gateway. The gateway may receive an indication that the first gateway identifier matches the second gateway identifier. The indication that the first gateway identifier matches the second gateway identifier may be received by the gateway from the client device, such as via the WLAN data communication channel, and/or the server, such as via the external data communication channel. The gateway may receive the second gateway identifier received by the client device (it is noted that this second gateway identifier from the client device may be different than expected if the client device is connected to a third-party gateway) and perform the determination based on the second gateway identifier received by the client device.

FIG. 2B shows a method 220. The method 220 may serve to verify a user data connection of a client device to a gateway within a WLAN. The method 220 may be performed in a system similar in some respects to the system 100 of FIG. 1. At step 222, a request may be received to verify a user data connection of a client device, via a WLAN data communication channel, to a gateway of the WLAN (e.g., the client device 106, the gateway 104, and the WLAN 120, respectively, of FIG. 1). The verification request may be directed to a WLAN data communication channel (e.g., the WLAN data communication channel 112 of FIG. 1) within the WLAN that is expected to effectuate user data communications between the client device and the gateway. The effectuated data communication channel, via the WLAN, may indicate that the client device, the gateway, and/or the WLAN are configured correctly. The client device may be configured (or attempted to be configured) to perform user data communication via the WLAN data communication channel with the gateway, such as via Wi-Fi. The client device may be configured to effectuate user data communication with the gateway via data communication channels external to the WLAN (e.g., the external data communication channels 114 and/or the WAN 110 of FIG. 1), such as a cellular data connection or a data connection via another WLAN and gateway.

The request to verify the client device's user data connection, via the WLAN, to the gateway may be received by an external server (e.g., the server 102) and/or the gateway. The request to verify may be received by the gateway and/or server via an external communication channel and/or the WAN. The server may receive the request to verify and send and/or effectuate the request to the gateway. A user associated with the client device may derive the request to verify at the server. The server may send and/or effectuate the request to the gateway.

At step 224, a first gateway identifier may be determined, such as by accessing the first gateway identifier. The first gateway identifier may be determined by the gateway and/or determined by the server. The first gateway identifier may be determined based on (e.g., responsive to) the request to verify the data connection of the client device to the gateway via the WLAN data communication channel. The first gateway identifier may be determined by the server based on a separate request for the first gateway identifier sent by the server to the gateway and a corresponding subsequent reply. The server may determine the first gateway identifier by reference to gateway information stored by the server.

The first gateway identifier may be a unique identifier and may comprise one or more of a UUID, a MAC address, or an SSID associated with the gateway. The first gateway identifier may be realized in the form of first gateway data. The first gateway data may comprise other data, such as cryptographic data, in addition to or instead of the first gateway identifier. The first gateway identifier and/or other data of the first gateway data may be transient. The cryptographic data or other data may be used to authenticate the first gateway identifier.

A URL (or other network location) may be determined, such as by the gateway and/or the server. The URL may comprise a non-routable IP address (or other form of network address or location) of the gateway. The URL may be determined by the gateway and/or the server. The server may receive the initial request to verify and send a separate request to the gateway for the URL. The server may maintain gateway information and reference said information to determine the URL and/or non-routable IP address. The URL may comprise the first gateway identifier. The first gateway identifier may be indicated in embedded code of the URL.

At step 226, the first gateway identifier and/or URL with the non-routable IP address may be sent to the client device. The first gateway identifier and/or URL may be sent to the client device via a data communication channel external to the WLAN, such as a cellular network and/or the WAN. The first gateway identifier and/or the URL may be sent by the gateway and/or the server. The first gateway identifier and/or URL may be sent by the gateway bypassing the server and/or via the server. The server may send the first gateway identifier and/or URL, such as if the server determined the first gateway identifier and/or URL.

At step 228, the gateway may receive a request for a second gateway identifier. The request may be received via the WLAN data communication channel (e.g., internal to the WLAN) and directed to the URL, which may comprise the non-routable IP address. The request may be received from the client device. The request from the client device (and/or receipt thereof) may be based on (e.g., responsive to) the first gateway identifier and/or URL received from the gateway and/or server. The request from the client device (and/or receipt thereof) may be based on (e.g., responsive to) the gateway and/or server sending the first gateway identifier and/or URL to the client device. The request for the second gateway identifier may be realized in the form of user data of a network data packet. The request for the second gateway identifier may be embedded in the URL.

The request from the client device may comprise a first data transmission based on the URL and via the WLAN data communication channel. The first data transmission may attempt to effectuate user data communication between the client device and the gateway via the WLAN data communication channel. If the first data transmission is successful, the gateway may send the second gateway identifier to the client device.

The gateway may determine that the client device attempted and failed to send a second request, using the URL comprising the non-routable IP address and via a data communication channel external to the WLAN (e.g., a cellular data communication channel) If so determined, the gateway may not return a response to the request that comprises user data, such as the second identifier. The gateway may only send control data in return to the request for the second identifier.

At step 230, the gateway may send the second gateway identifier to the client device via the WLAN data communication channel. The gateway may send the second gateway identifier to the client devise based on (e.g., responsive to) the received request for the second gateway identifier. The second gateway identifier may be distinguished from the first gateway identifier in that the first gateway identifier was received by the client device via a data communication channel external to the WLAN (e.g., the WAN, an external data communication channel, and/or the server) while the second gateway identifier was received by the client device from the gateway via the WLAN data communication channel, internal to the WLAN. The second gateway identifier may be sent as user data in a network data packet addressed to the client device.

At step 232, a determination may be made whether the client device is properly connected for user data communications with the gateway via the WLAN data communication channel. The determination may be performed by the gateway and/or the server. The determination may be based on data or a message from the client device that is sent to the gateway and/or server. The message to the gateway or server may indicate the results of a comparison (e.g., performed by the client device) of the first gateway identifier with the second gateway identifier. If the message indicates a match (or other expected relationship) between the first gateway identifier and the second gateway identifier, this may indicate that the client device is connected to the gateway to effectuate user data communications therebetween via the WLAN. If the message indicates that the first gateway identifier and the second gateway identifier do not match (or are otherwise not as expected), this may indicate that the client device is not properly connected to the gateway via the WLAN data communication channel.

The determination may be performed based on data or a message from the client device comprising the first gateway identifier and/or the second gateway identifier. Such data or message may be received by the server and/or the gateway. The server and/or or gateway may perform the comparison of the two gateway identifiers and thereby may determine whether the client device is connected to the gateway for data communications via the WLAN. The server and/or gateway may receive the second gateway identifier (without the first gateway identifier). The server and/or gateway may already store the first gateway identifier and may perform the comparison of the first gateway identifier and the second gateway identifier accordingly.

The determination that the client device is connected to the intended gateway of the WLAN may be based on various cryptography techniques or the like. The gateway may send (e.g., based on or in response to the first data transmission and/or the second data transmission) an encrypted portion of data associated with the gateway and/or the second gateway identifier to the client device. The encrypted data may be sent to the client device in conjunction with the second gateway identifier. The encrypted data may be processed by the client device to authenticate data sent from the gateway, such as the second gateway identifier sent from the gateway, and/or the identity of the gateway that sent the encrypted data. The encrypted data may be sent from the client device to the server for the server to process the encrypted data. The server may send the result of the server's processing to the client device. Based on the results provided by the server, the client device may determine that the client device is connected (with respect to user data) to the intended gateway via the WLAN data communication channel and may exchange user data communications with the gateway. The server may determine that the client device is properly connected to the gateway via the WLAN data communication channel and notify the client device and/or user associated with the client device accordingly.

The gateway may be sent information, which will be referred to as "authentication information". The gateway may be sent the authentication information in conjunction with the request to the gateway for the URL comprising the non-routable IP address and/or the first gateway identifier (such as that described above in relation to step 204), but is not so limited. The authentication information may be sent to the gateway by the server. The authentication information may be encrypted before being sent to the gateway or the gateway may encrypt the authentication information. The authentication information may be encrypted with a public key. When the gateway sends the gateway identifier (referred to then as the second gateway identifier) to the client device based on receiving the first data transmission and/or second data transmission, the gateway may send the encrypted authentication information to the client device in conjunction with the second gateway identifier. The client device and/or the server may decrypt the authentication information using a private key associated with the public key that was used for the encryption. The determination of whether the client device is properly connected to the gateway for user data communication with the gateway via the WLAN data communication channel may be based on the decrypted authentication information.

A cryptographic nonce may be used to determine that the client device is properly connected to the gateway. A nonce may be appended to, incorporated with, and/or associated with the authentication information and/or the gateway identifier stored by the gateway. The nonce may be transient and/or non-durable. The server may provide the nonce with the authentication information and/or direct the gateway to include the nonce with the authentication information. The server may direct the gateway to store and provide a particular gateway identifier, which may comprise the nonce. The nonce portion of the authentication and/or gateway identifier may not be indicated as such to the gateway and/or the client device. Based on receiving the first data transmission and/or the second data transmission, the gateway may send the gateway identifier (as the second gateway identifier) and/or authentication information (either of which may comprise the nonce) to the client device. The client device may send the gateway identifier and/or the authentication information to the server for the server to analyze the gateway identifier and/or the authentication information. The client device may analyze the gateway identifier and/or the authentication information. The client device and/or the server may recognize the nonce as that expected and process the second gateway identifier as normal. If the client device and/or the server does not recognize the nonce as that expected, this may indicate that the client device is not properly connected to the intended gateway but may be connected to an imposter gateway. The nonce may prevent or reduce replay attacks. The transient nature of the nonce may prevent a third party from capturing a message from the gateway to the client device and using that at a later time to masquerade an imposter gateway as the true gateway.

The server may direct the gateway as to the gateway's gateway identifier. The server may send the gateway identifier in conjunction with the request for the URL comprising the un-routable IP address. Since the server is sending, to the gateway, the gateway's gateway identifier, there is no need for the server to request the gateway's gateway identifier. The gateway identifier sent to the gateway by the server may be transient (e.g., timestamped or otherwise associated with a timing element). The server may not acknowledge this gateway identifier beyond a time threshold or outside of a time window. Based on the gateway receiving the first data transmission and/or the second data transmission, the gateway may send this server-specified gateway identifier to the client device. The client device may send the gateway identifier to the server and the server may determine if the gateway identifier is valid or not based on the timing element associated with the gateway identifier and/or the time at which the gateway identifier was received by the client device. The determination of whether the client device is properly connected to the gateway via the WLAN data communication channel may be based on the analysis of the timing element of the received gateway identifier.

The server may indicate the gateway identifier that the gateway is to store and provide as the gateway's gateway identifier, but without the timing element. The client device and/or the server may determine if the second gateway identifier received by the client device is the gateway identifier specified by the server and which is expected to be received as the second gateway identifier. The determination of whether the client device is properly connected to the gateway via the WLAN data communication channel may be based on the second gateway identifier matching this specified gateway identifier.

The second gateway identifier may be digitally signed, such as by the gateway. The gateway may digitally sign the second gateway identifier before the gateway sends the second gateway identifier to the client device. The client device may be configured to authenticate the digital signature and thereby also the associated second gateway identifier. The client device may be configured to authenticate, via the digital signature, the sender of the second gateway identifier, anticipated to be the gateway and not an imposter gateway. The second gateway identifier may be digitally signed by the gateway using a public key cryptography technique. The second gateway identifier may be signed with a private key and the client device and/or server may apply an associated public key to authenticate the digital signature.

Figure 3:
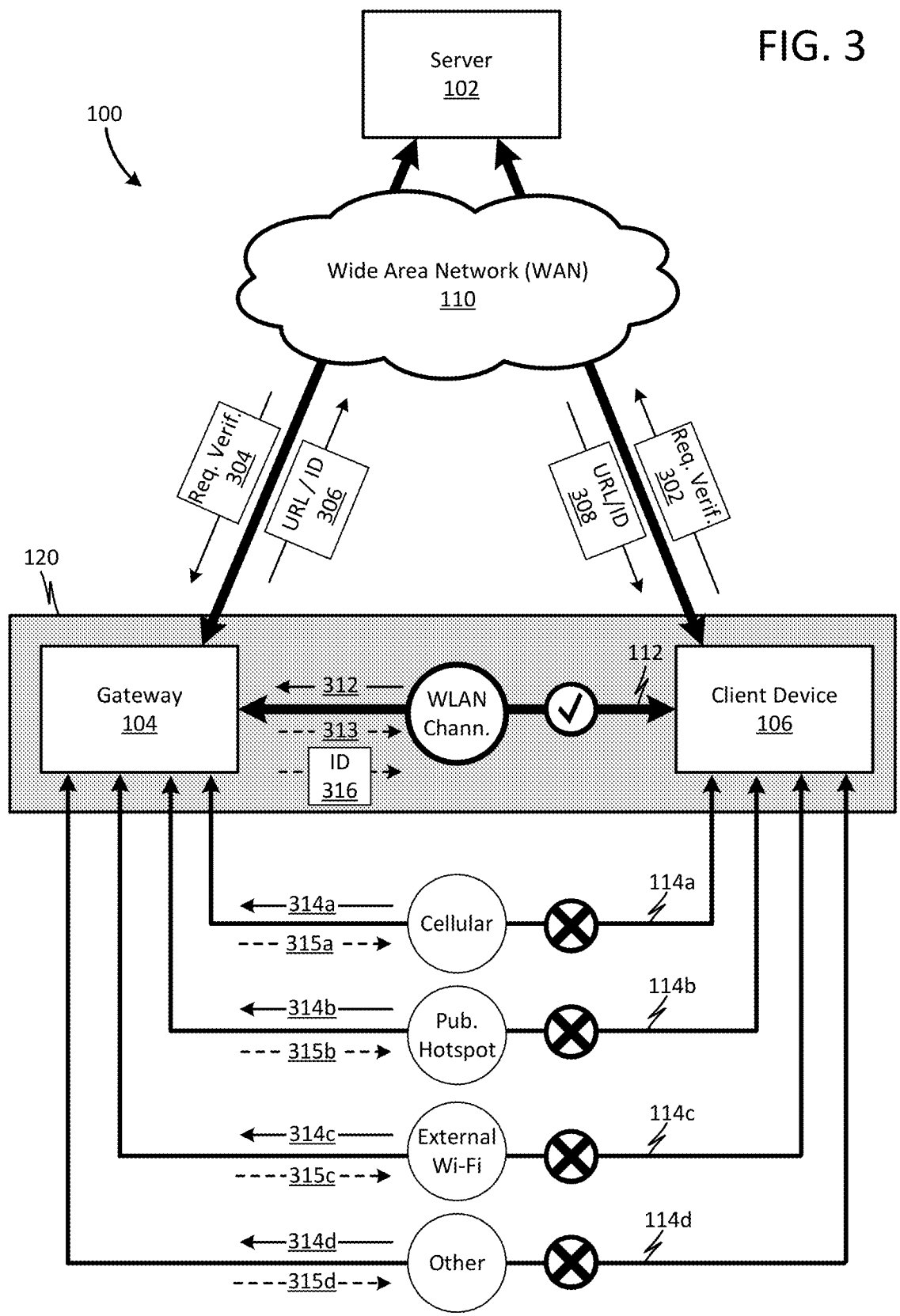
FIG. 3 shows a schematic diagram of a system and data flow.

FIG. 3 shows the system 100 (FIG. 1) and a data-exchange in the system 100 to verify the client device's 106 connection to the gateway 104 via the WLAN data communication channel 112. The client device 106 may send a request to verify 302 that may initiate the verification process. The request to verify 302 may be sent to the server 102 via the WAN 110 and/or the external data communication channels 114. An internet-provider technician may cause the transmission of the request to verify 302 after the technician has installed network hardware, such as the gateway 104. A user may likewise cause the request to verify 302 to be sent. The request to verify 302 may comprise a user account identifier and/or credential to authentic with the server 102 and to identify the user's account, client device 106, and/or gateway 104.

Based on receiving the request to verify 302 from the client device 106, the server 102 may send its own request to verify 304 to the gateway 104. The request to verify 304 from the server may be a forward or relay of the request to verify 302 from the client device 106 or the server 102 may separately generate the request to verify 304. The request to verify 304 from the server 102 may comprise a request for a URL (e.g., a URL to a non-routable IP address) and/or a first gateway identifier of the gateway 104. The request to verify 304 may be transmitted to the gateway 104 via the WAN 110. Based on receiving the request to verify 304 from the server 102, the gateway 104 may transmit a URL/identifier 306 to the server 102. The URL/identifier 306 may indicate a URL comprising a non-routable IP address of the gateway 104, which may be in the form of HTTP request. The URL/identifier 306 may indicate a first gateway identifier of the gateway 104. The first gateway identifier may comprise a UUID, a MAC address, and/or an SSID of the gateway. The URL/identifier 306 from the gateway 104 may be received by the server 102 via the WAN 110. The URL comprising the non-routable IP address and/or the first gateway identifier of the gateway may be known by the server 102, in which case the request to verify 304 and/or the URL/identifier 306 may be omitted.

The server 102 may transmit the URL/identifier 308 to the client device 106. The URL/identifier 308 may be similar in some respect to the URL/identifier 306. The URL/identifier 308 may comprise the URL with the non-routable IP address of the gateway 104 and/or the first gateway identifier of the gateway 104. The URL/identifier 308 may represent a relay of the URL/identifier 306 from the gateway 104, which may be relayed via the server 102, as shown here. The URL/identifier 308 may be relayed via other systems and/or network elements. The URL/identifier 308 may be sent to the client device 106 via the WAN 110 and/or one or more of the external data communication channels 114.

The client device 106 may receive the URL/identifier 308 and process the URL/identifier 308 to determine the URL comprising the non-routable IP address and the first gateway identifier. The client device 106 may store the URL (and/or the non-routable IP address separately) and/or the first gateway identifier of the gateway. The client device 106 may attempt to cause a first data transmission 312 (e.g., the first data transmission of the method 200 of FIG. 2A) to the gateway 104 via the WLAN data communication channel 112 internal to the WLAN 120. The first data transmission 312 may be based on the URL of the URL/identifier 308 and directed to the non-routable IP address of the gateway 104. The first data transmission 312 may comprise a request for the gateway identifier stored on the gateway 104. The request for the gateway identifier may be indicated as embedded code in the URL of the first data transmission 312. The request for the gateway identifier stored on the gateway 104 may be indicated in user data of the first data transmission.

If the gateway 104 receives the first data transmission 312, the gateway 104 may send the response 313 to the client device 106 via the WLAN data communication channel 112. The response 313 may comprise an indication that the first data transmission 312 to the gateway 104 was successful. The response 313 may comprise user data indicating the success of the first data transmission 312. The response 313 may comprise an HTTP success status code. If the first data transmission 312 to the gateway 104 was not successful, the response 313 may comprise an indication of the first data transmission 312 failure, such as an HTTP error status code. The "response" 312 may comprise a lack of a response. As shown in FIG. 3, the first data transmission 312 is successful and the response 313 indicates that the first data transmission 312 was successful.

The client device 106 may attempt to cause one or more second (or additional) data transmissions 314*a-d* to the gateway 104 via the respective external data communication channel 114*a-d*. The second data transmissions 314*a-d* may be similar in some respect to the first data transmission 312. The second data transmissions 314*a-d* are sent via the external data communication channels 114. As shown in FIG. 3, the second data transmissions 314*a-d* are not successful and the respective responses 315*a-d* may indicate the failures. The responses 315*a-d* may comprise an HTTP error status code or may reflect that no response was received from the gateway 104 at all. The responses 315*a-d* may comprise control data indicating the lack of success. The success response 313 to the first data transmission 312 via the WLAN data communication channel 112 and the responses 315*a-d* to the second data transmissions 314*a-d* indicating failed user data connections via the external data communication channels 114 may indicate, at least in part, that the client device 106 and/or the WLAN 120 are configured properly.

The gateway 104 may send a second gateway identifier 316 to the client device 106. The gateway 104 sending the second gateway identifier 316 may be based on (e.g., responsive to) the gateway 104 receiving the first data transmission 312. The response 313 may comprise the second gateway identifier 316 or the second gateway identifier 316 may be sent independently. The second gateway identifier 316 may match the first gateway identifier indicated in the URL/identifier 306 and/or the URL/identifier 308 (e.g., the second gateway identifier 316 and the first gateway identifier both may indicate the same gateway: the gateway 104). The response 313 may comprise the second gateway identifier 316 as user data of the response 313. The second data identifier 316 may form at least part of the user data of another response from the gateway 104.

A determination may be made, such as by the client device 106, that the gateway 104 is the expected gateway (e.g., the gateway 104) of what is intended to be the WLAN 120. The determination may comprise a comparison of the first gateway identifier (e.g., that indicated in the URL/identifier 306 and the URL/identifier 308) and the second gateway identifier 316 received from what is expected to be the gateway 104. If the first gateway identifier and the second gateway identifier 316 match (e.g., both identify the same gateway 104), this may indicate, at least in part, that the client device 106 is properly configured and connected to the gateway 104 via the WLAN data communication channel 112 to exchange user data communications with the gateway 104. If the first gateway identifier and the second gateway identifier 316 do not match, this may indicate, at least in part, that the responding gateway is not the expected gateway 104. This may indicate that the client device 106 is connected to a benign other gateway or a malicious imposter gateway.

The determination that the first data transmission 312 was successful and the determination that the second gateway identifier 316 and the first gateway identifier match may indicate that the client device 106, the gateway 104, and/or the WLAN 120 are properly configured. This may indicate that the client device 106 may exchange user data communications with the gateway 104 via the WLAN data communication channel 112. This may indicate that the client device 106 may exchange user data communications with network resources external to the WLAN 120 via the WLAN data communication channel 112 and the gateway 104.

Figure 4:
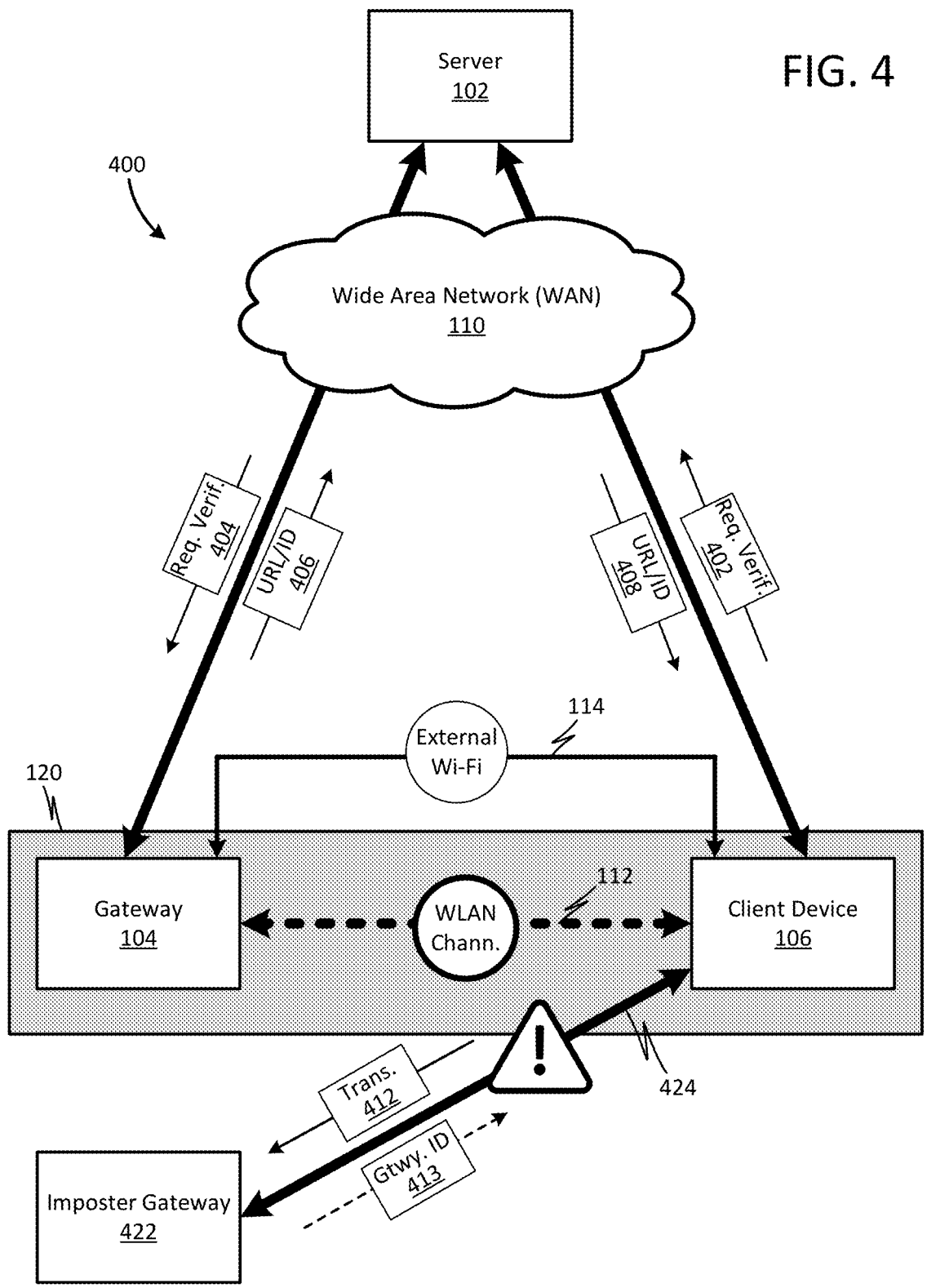
FIG. 4 shows a schematic diagram of a system and data flow.

FIG. 4 shows a system 400 and a data exchange for verifying whether the client device 106 is connected to the gateway 104 via the WLAN data communication channel 112. The system 400 is similar is some respects to the system 100 shown in FIGS. 1 and 3. Accordingly, like reference characters refer to like elements. The client device 106 is intended to connect to the gateway 104 via the WLAN data communication channel 112 to effectuate user data communication therebetween. Another gateway may be nearby the client device 106 (e.g., within wireless communication range) and the client device 106 may be inadvertently connected to the other gateway via a data communication channel 424. Similar in some respect to the WLAN data communication channel 112, the data communication channel 424 may comprise a Wi-Fi or other wireless connection. The presence and/or configuration of the other gateway may be accidental or benign or it may be purposeful and with the ill intent to access communications from the client device 106, such as personal financial information or credentials.

The other gateway may comprise an imposter gateway 422, which is configured to mimic the gateway 104. The imposter gateway 422 may be configured to identify itself as the same SSID as the gateway 104. The gateway 104 may publicly broadcast its SSID and thus the gateway's 104 SSID may be identified by third parties. The imposter gateway 422 may operate using a "spoofed" IP address in the transmissions by the imposter gateway 422. The imposter gateway 422 may cause the transmissions therefrom to appear to originate from an IP address other than that of the imposter gateway 422. The "spoofed" source IP address of a transmission from the imposter gateway 422 may mimic the IP address of the gateway 104. The client device 106 may incorrectly regard said transmission from the imposter gateway 422 as a transmission from the gateway 104. A user installing or configuring the WLAN 120 may mistake the imposter gateway 422 for the correct gateway 104. The verification process described herein may determine that the client device 106 is connected to the imposter gateway 422 instead of the intended gateway 104.

Similar in some respects to the data flow shown in FIG. 3, the client device 106 may transmit a request to verify 402 the client device's 106 connection (with respect to user data) to the gateway 104. A request to verify 404, based on the request to verify 402 from the client device 106, may be sent to the gateway 104. Based on the request to verify 404, the gateway 104 may transmit a URL/identifier 406. The URL/identifier 406 may comprise a URL indicating a non-routable IP address of the gateway 104. The URL/identifier 406 may comprise a gateway identifier of the gateway 104, referred to as the first gateway identifier. The first gateway identifier may be a unique identifier of the gateway 104. A URL/identifier 408, based on the URL/identifier 406 from the gateway 104, may be sent to the client device 106. The client device 106 may store the first gateway identifier indicated in the URL/identifier 408.

Based on the non-routable IP address identified in the URL/identifier 408, the client device 106 may cause one or more data transmissions (not represented in FIG. 4) to the gateway 104 via the external data communication channels 114. The client device 106 may cause a data transmission 412 to what is believed to be the intended gateway 104. Similar in some respects to the other data transmissions to the gateway described herein, the data transmission 412 may be addressed to the non-routable IP address and may comprise a request for a gateway identifier (a "second" gateway identifier, as referred to elsewhere herein). The data transmission 412 may comprise user data indicating the request for the second gateway identifier. The data transmission 412 is actually sent to the imposter gateway 422 via the data communication channel 424. The imposter gateway 422 may reply with a response indicating that the data transmission 412 was successful. The imposter gateway 422 may reply with the imposter gateway's 422 gateway identifier 413 (e.g., as user data of the reply) and/or may not reply with a gateway identifier at all.

The client device 106 may receive the gateway identifier 413 from the imposter gateway 422. The client device 106 may compare that gateway identifier 413 from the imposter gateway 422 with the first gateway identifier stored on the client device 106. The first gateway identifier stored on the client device 106 may be the gateway identifier provided by the gateway 104 in the URL/identifier 406 transmitted based on the request to verify 404. The first gateway identifier may indicate the true gateway identifier of the gateway 104. In the comparison, the client device 106 may determine that the gateway identifier 413 from the imposter gateway 422 does not match the first gateway identifier stored on the client device. The client device 106 may determine that the gateway identifier 413 is incorrect and, thus, the client device 106 is not properly connected to the gateway 104 via the WLAN data communication channel to enable user data communication between the client device 106 and the gateway 104.

The client device 106 may terminate the connection to the imposter gateway 422 based on the determination that the imposter gateway 422 is not in fact the gateway 104. The client device 106 may terminate the connection to the imposter gateway 422 automatically. The client device 106 may provide a notification to the user and/or technician indicating the incorrect connection. The user and/or technician may thereby terminate the connection. By doing so, the risk that the imposter gateway 422 may extract data sent to and/or from the client device 106 may be eliminated or reduced. As indicated, user data to and/or from the client device may comprise confidential information, such as financial information and/or credentials (e.g., login information and/or passwords).

The imposter gateway 422 may operate using a "spoofed" IP address in the transmissions by imposter gateway 422. The imposter gateway 422 may cause the transmissions therefrom to appear to originate from an IP address other than that of the imposter gateway 422. The "spoofed" source IP address of a transmission from the imposter gateway 422 may mimic the IP address of the gateway 104. The client device 106 may incorrectly regard said transmission from the imposter gateway 422 as a transmission from the gateway 104.

Figure 5:
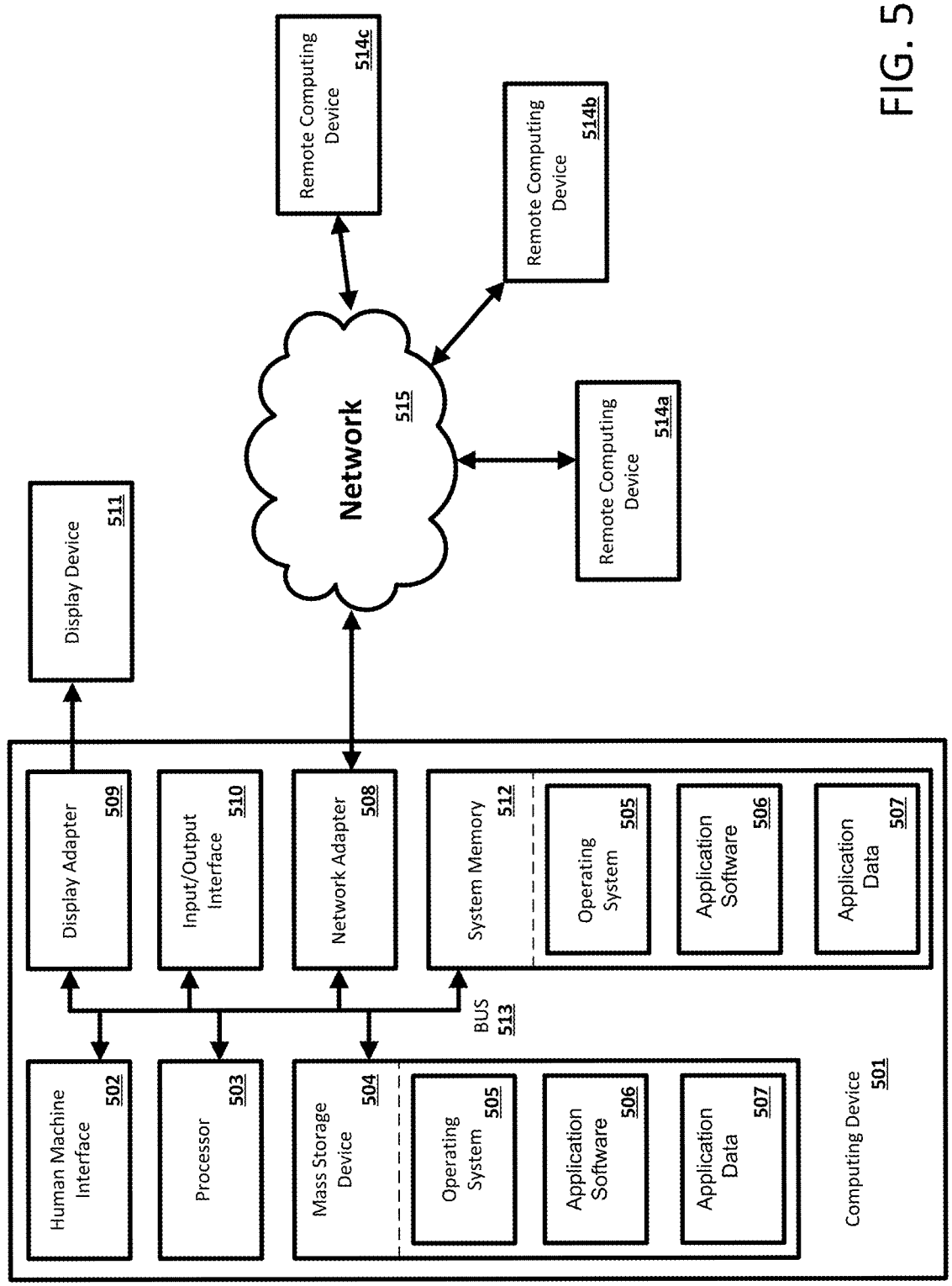
FIG. 5 shows a schematic diagram of a computing device.

The systems, methods, and apparatuses described herein may be implemented on a computing device such as a computing device 501 (e.g., computer) as shown in FIG. 5 and described below. The server 102, the gateway 104, the client device 106 may be a computing device as shown in FIG. 5. Similarly, the methods, systems, and apparatuses disclosed may utilize one or more computing device to perform one or more functions in one or more locations. FIG. 5 is a block diagram showing an operating environment for performing the disclosed methods, systems, and apparatuses. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Generally, program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 501. The components of the computing device 501 may comprise, but are not limited to, one or more processors 503, a system memory 512, and a system bus 513 that couples various system components including the processor 503 to the system memory 512. With multiple processors 503, the system may utilize parallel computing.

The system bus 513 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description may be implemented over a wired or wireless network connection and each of the subsystems, including the processor 503, a mass storage device 504, an operating system 505, a service software 506, a service data 507, a network adapter 508, system memory 512, an Input/Output Interface 510, a display adapter 509, a display device 511, and a human machine interface 502, may be contained within one or more remote computing devices 514a, b, c at physically separate locations, connected through buses of this form, in effect implementing a fully distributed system.

The computing device 501 typically comprises a variety of computer readable media. Readable media may be any available media that is accessible by the computing device 501 and comprises both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as service data 507 and/or program modules such as operating system 505 and service software 506 that are immediately accessible to and/or are presently operated on by the processor 503.

The computing device 501 may comprise other removable/non-removable, volatile/non-volatile computer storage media. FIG. 5 shows a mass storage device 504 which may provide non-volatile storage of computer code, computer readable instructions, data structures, program modules, and other data for the computing device 501. A mass storage device 504 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 504, including an operating system 505 and service software 506. Each of the operating system 505 and service software 506 (or some combination thereof) may comprise elements of the programming and the service software 506. Service data 507 may be stored on the mass storage device 504. Service data 507 may be stored in any of one or more databases known in the art. Such databases may comprise, DB2®, Microsoft® Access, Microsoft® SQL Server, Oracle®, my SQL, PostgreSQL, and the like. The databases may be centralized or distributed across multiple systems.

The user may enter commands and information into the computing device 501 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 503 via a human machine interface 502 that is coupled to the system bus 513, but may be connected by other interface and bus structures, such as a parallel port, game port, an IEEE 1394 Port (also known as a Firewire port), a serial port, or a universal serial bus (USB).

A display device 511 may be connected to the system bus 513 via an interface, such as a display adapter 509. It is contemplated that the computing device 501 may have more than one display adapter 509 and the computing device 501 may have more than one display device 511. A display device may be a monitor, an LCD (Liquid Crystal Display), or a projector. Output peripheral devices may comprise components such as speakers (not shown) and a printer (not shown) which may be connected to the computing device 501 via Input/Output Interface 510. Any step and/or result of the methods may be output in any form to an output device. Such output may be any form of visual representation, including, but not limited to, textual, graphical, animation, audio, tactile, and the like. The display 511 and computing device 501 may be part of one device, or separate devices.

The computing device 501 may operate in a networked environment using logical connections to one or more remote computing devices 514a, b, c. A remote computing device may be a personal computer, portable computer, smartphone, a server, a router, a network computer, a peer device or other common network node, and so on. Logical connections between the computing device 501 and a remote computing device 514a, b, c may be made via a network 515, such as a local area network (LAN) and a general wide area network (WAN). Such network connections may be through a network adapter 508. A network adapter 508 may be implemented in both wired and wireless environments. Such networking environments are conventional and commonplace in dwellings, offices, enterprise-wide computer networks, intranets, and the Internet.

Application programs and other executable program components such as the operating system 505 are shown herein as discrete blocks, although it is recognized that such programs and components reside at various times in different storage components of the computing device 501, and are executed by the data processor(s) of the computer. An implementation of service software 506 may be stored on or transmitted across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. The endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods, systems, and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods, systems, and apparatuses. This applies to all features of this application including, but not limited to, components and/or steps in disclosed methods, systems, and apparatuses. Thus, if there are a variety of additional steps that may be performed it is understood that each of these additional steps may be performed with any specific embodiment or combination of embodiments of the disclosed methods, systems, and apparatuses.

While the methods, systems, and apparatuses have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method comprising:
   receiving, by a client device, a network resource location associated with a gateway of a wireless local area network (WLAN);
   receiving, by the client device, via a communication channel external to the WLAN, first gateway data associated with the gateway;
   sending, by the client device and via the WLAN, a first data packet directed to the network resource location associated with the gateway;
   receiving, by the client device, from the gateway, and via the WLAN, second gateway data associated with the gateway, wherein the receiving the second gateway data is based on the sending the first data packet; and
   determining, based on the first gateway data and the second gateway data, that the client device is configured to communicate, via the WLAN, with the gateway.

2. The method of claim 1, wherein the determining that the client device is configured to communicate, via the WLAN, with the gateway comprises determining that the first gateway data and the second gateway data both indicate the gateway.

3. The method of claim 1, wherein the first data packet comprises a request for the second gateway data.

4. The method of claim 1, wherein the receiving the network resource location associated with the gateway comprises receiving, via the communication channel external to the WLAN, the network resource location associated with the gateway.

5. The method of claim 1, wherein the first gateway data comprises first cryptographic information associated with the gateway and the second gateway data comprises second cryptographic information associated with the gateway, and wherein the determining that the client device is configured to communicate, via the WLAN, with the gateway is further based on the first cryptographic information and the second cryptographic information.

6. The method of claim 1, wherein the determining that the client device is configured to communicate, via the WLAN, with the gateway comprises determining, by a server located external to the WLAN, that the client device is configured to communicate, via the WLAN, with the gateway.

7. The method of claim 1, wherein the determining that the client device is configured to communicate, via the WLAN, with the gateway comprises determining, by the client device, that the client device is configured to communicate, via the WLAN, with the gateway.

8. The method of claim 1, further comprising:
   sending, from the client device and via at least one of the communication channel external to the WLAN and a second communication channel external to the WLAN, a second data packet directed to the network resource location associated with the gateway, wherein the network resource location associated with the gateway comprises a non-routable network address; and
   determining, based on a response to the sending the second data packet, that the client device is not configured to communicate, via the non-routable network address and the at least one of the communication channel external to the WLAN and the second communication channel external to the WLAN, with the gateway.

9. The method of claim 1, wherein the communication channel external to the WLAN comprises at least one of a cellular network, a public hotspot network, and a second WLAN.

10. The method of claim 1, wherein the gateway is configured to facilitate data communications between the WLAN and a second network external to the WLAN.

11. A method, comprising:

sending, via a communication channel external to a wireless local area network (WLAN) and to a client device associated with the WLAN, a network resource location associated with a gateway of the WLAN;

accessing first gateway data associated with the gateway;

receiving, by the gateway, from the client device, and via the WLAN, a first data packet directed to the network resource location associated with the gateway;

sending, from the gateway, to the client device, via the WLAN, and based on the first data packet directed to the network resource location associated with the gateway, second gateway data associated with the gateway; and determining, based on the first gateway data and the second gateway data, that the client device is configured to communicate, via the WLAN, with the gateway.

12. The method of claim 11, wherein the first gateway data indicates the gateway and the second gateway data indicates the gateway.

13. The method of claim 11, wherein the first data packet comprises a request for the second gateway data.

14. The method of claim 11, wherein:

the sending the network resource location associated with the gateway comprises sending, from the gateway and to the client device, the network resource location associated with the gateway, and the accessing first gateway data associated with the gateway comprises sending, from the gateway, to the client device, and via the communication channel external to the WLAN, the first gateway data associated with the gateway.

15. The method of claim 11, wherein:

the sending the network resource location associated with the gateway comprises sending, from a server located external to the WLAN and to the client device, the network resource location associated with the gateway, and the accessing first gateway data associated with the gateway comprises sending, from the server, to the client device, and via the communication channel external to the WLAN, the first gateway data associated with the gateway.

16. The method of claim 11, further comprising:

receiving, by the gateway, an indication that a first gateway indicated by the first gateway data and a second gateway indicated by the second gateway data match, wherein the determining that the client device is configured to communicate, via the WLAN, with the gateway is further based on the indication that the first gateway indicated by the first gateway data and the second gateway indicated by the second gateway data match.

17. A system comprising:

a gateway of a wireless local area network (WLAN); and a server located external to the WLAN, wherein the server is in communication, via one or more communication channels external to the WLAN, with the gateway and a client device associated with the WLAN, wherein the gateway is configured to:

send, to the client device and via the one or more communication channels external to the WLAN, a network resource location associated with the gateway;

send first gateway data associated with the gateway;

receive, from the client device, and via the WLAN, a first data packet directed to the network resource location associated with the gateway;

send, to the client device, via the WLAN, and based on the first data packet directed to the network resource location associated with the gateway, second gateway data associated with the gateway;

receive an indication that a first gateway indicated by the first gateway data and a second gateway indicated by the second gateway data match; and determine, based on the indication that the first gateway indicated by the first gateway data and the second gateway indicated by the second gateway data match, that the client device is configured to communicate, via the WLAN, with the gateway.

18. The system of claim 17, wherein the first data packet comprises a request for the second gateway data.

19. The system of claim 17, wherein the gateway is configured to send, via the server, the network resource location associated with the gateway.

20. The system of claim 17, wherein the gateway is configured to receive, from the server, the indication that the first gateway indicated by the first gateway data and the second gateway indicated by the second gateway data match.

* * * * *